United States Patent [19]
Stevens

[11] 3,791,404
[45] Feb. 12, 1974

[54] FLOAT VALVE

[76] Inventor: Elbert M. Stevens, 1000 N. Alamo St., San Antonio, Tex. 78215

[22] Filed: Apr. 27, 1972

[21] Appl. No.: 248,258

[52] U.S. Cl. ............................ 137/433, 73/322.5
[51] Int. Cl. ............................................. F16k 31/22
[58] Field of Search .......... 137/429, 430, 432, 433; 73/322.5

[56] References Cited
UNITED STATES PATENTS

| | | | |
|---|---|---|---|
| 2,854,023 | 9/1958 | Heyer | 137/432 |
| 2,122,866 | 7/1938 | Lippold | 137/432 |
| 2,646,819 | 7/1953 | Lippold | 137/432 |

Primary Examiner—Martin P. Schwadron
Assistant Examiner—David R. Matthews
Attorney, Agent, or Firm—Donald R. Comuzzi

[57] ABSTRACT

A float-controlled valve for maintenance of liquid levels in tanks without sensitivity to the supply pressure. It includes an apertured, inner-tube for connection to the liquid supply and a float-actuated, outer-skirt closing flow by closing against gaskets on longitudinally-opposite sides of the apertures and opening flow by motion away from one of the gaskets.

6 Claims, 2 Drawing Figures

PATENTED FEB 12 1974 3,791,404

FLOAT VALVE

BACKGROUND OF THE INVENTION

The present invention relates to valves and is more particularly concerned with float-actuated valves for level-control, in zones such as cattle troughs, avoiding delicate mechanisms or problems such as pressure-override of the float or "searching" or fast-cycling of the valve.

BRIEF DESCRIPTION OF THE PRIOR ART

A variety of float-actuated valves have been and are available, ranging from the most familiar float/lever/valve in household toilets to complex float/lever/variable-orifice valves. Included are the simple valves in which the high water level lifts a bouyant ball directly into the seating aperture to close off the flow, while a low water level allows the ball to drop out and establish flow. However, the prior valves have not been found to be entirely satisfactory.

Where substantial water pressures are encountered, relatively large floats or high mechanical-advantage lever systems are required to contain such pressure.

Installations employing relatively low waterpressures are prone to problems of sticking-closed when the water level drops, especially since they usually employ lightweight assemblies in trashy water.

This problem is particularly acute in livestock-watering units, where trash such as hay, grass, or feedstuff usually is carried to the trough by the animals and, typically, ends up floating on the surface, right at the level at which such floats work.

Where prior units remove the valve itself from the float level, such as by using linkage from the float to an elevated valve, the float mechanisms are prone to damage such as by bumpings from crowding livestock.

SUMMARY OF THE INVENTION

In general, the preferred form of the present invention comprises a valve having an inlet and a hollow cylindrical tube with radial ports therein, the tube being closed at its end remote from the inlet. A pair of O-rings are positioned surrounding the tube and longitudinally spaced from each other on opposite sides of the radial parts.

A tubular skirt surrounds the tube and is mounted for longitudinal reciprocation with respect to the tube. Float means engage a selected one of the tubes and skirt members to provide for reciprocation therebetween in reaction to changing levels of the float.

DESCRIPTION OF THE PREFERRED EMBODIMENT

Figure 2:
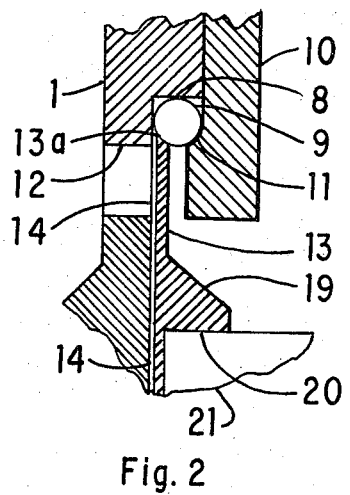
FIG. 2 is an enlarged partial-view similar to FIG. 1 and showing the valve in its closed position.

As shown in the drawings, the preferred form of the present invention includes a valve body 1 having a threaded inlet 2 and a bore 3 therein. The body includes a tubular extension or tube 4, which includes a portion of the bore 3 therein and which extends outwardly from the inlet portion of the body and terminates in a closed end 5. Adjacent the end 5 the tube 4 has a peripheral groove 6 receiving an O-ring 7.

At the inner end of the tube 4 adjacent the shoulder 8 formed by the junction of the tube with the body 3, an O-ring 9 surrounds the tube. The O-ring is held in position against the tube 4 and against the shoulder 8 by a sleeve 10, which may be mounted on the body in any suitable manner such as by a shrink-fit, as shown, or by threading. As best seen in FIG. 2, the sleeve 10 has a shoulder 11 extending inwardly toward the tube 4 to hold the O-ring in place.

The tube 4 is provided with a plurality of radial ports 12 adjacent the zone of the O-ring 9.

A cylindrical skirt 13, having a chamfered upper edge 13a and a bore 14 is mounted for reciprocation along the exterior of the tube 4. The diameter of the bore 14 is only slightly larger than the diameter of the tube 4. Also, the O-ring 7 has an outer diameter larger than that of the tube 4 so that it bears against the bore 14, in sealing engagement, as the skirt 13 reciprocates along the tube 4.

Outward travel of the skirt 13 is limited by a flange 15 secured against the tube end 5 via a spacer extension 16 and a screw 17 threaded into a bore 18 in the closed end of the tube.

Externally, the skirt 13 carries a tapered flange 19 which provides a flat shoulder 20 against which a buoyant float member 21 may be mounted by any suitable means. Also, the main body 1 is provided with two opposite flats 22 and 23 and shoulders 24 and 25.

While the description of the preferred embodiment is with reference to a cast metal valve, it will be appreciated that the valve may be pressure molded from suitable plastic material and thereby eliminate several of the valve components.

OPERATION OF THE PREFERRED EMBODIMENT

Figure 1:
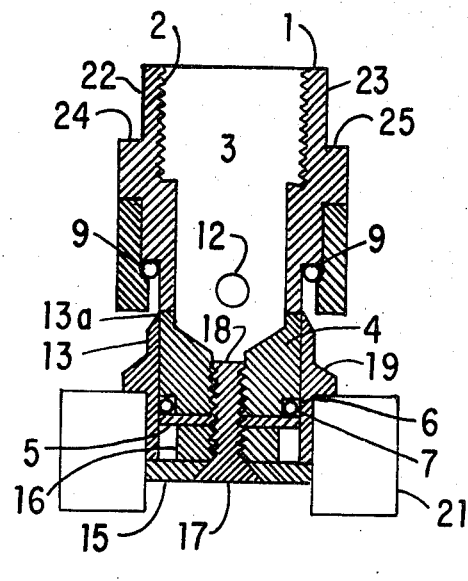
FIG. 1 is a sectional view of a preferred form of the invention.

In use, the threaded inlet is secured on a water supply pipe (not shown) with the tube 4 extending downward toward the water level desired. In the absence of the required level of water, the float 21 and skirt 13 will be in the lowered position shown in FIG. 1.

When water is supplied to the inlet 2, the water will flow through the bore 3 and the radial ports 12, past the skirt 13 and into the trough (not shown).

When the water has approached the desired level, the float 21 and, consequently, the skirt 13 will be raised therewith, progressing upwardly with the water until the upper edge 13a of the skirt 13 is engaged against the O-ring 9, as shown in FIG. 2.

While the upper edge 13a of the skirt closes against the O-ring 9, the bore 14 of the skirt remains in sealing engagement with the O-ring 7. Therefore, although the waterpassage through the radial ports 12 is still open into the bore 14, further flow is blocked at both ends by the O-rings, thereby stopping flow to the trough as long as the float 21 maintains the edge 13a in sealing engagement with the O-ring 9.

It is of particular importance that, whatever the water pressure in the system, it cannon exert a motive pressure on the movable portions of the valve. That is, the pressure exerted on the bore 14 of the skirt is perpendicular to the direction of reciprocation of the valve elements, instead of being parallel to the motion.

It should be noted that, even under conditions of extreme water-pressure, the worst that can happen is a slight dripping from seepage past the O-rings. The valve cannot be forced open by supply pressure.

In the absence of a piston effect, or of piston surfaces against which the water pressure can act, the valve of the present invention can employ a direct-mounted float, entirely without breakable levers or linkage. Also, since pressure is not a factor to be overcome by the float, the float need not be massive and is required only to lift the weight of the skirt 13 against gravity and against the mild drag of the sealing O-ring 7.

Various changes may be made in the details of the invention as described, without sacrificing the advantages thereof or departing from the scope of the appended claims.

I claim:

1. A flow-control valve including
   a. a valve body having
   b. an inlet,
   c. a cylindrical surface on said body having
   d. at least one discharge aperture therein in communication with said inlet,
   e. a cylindrical skirt member mounted for reciprocation with respect to said discharge aperture and spaced from the body surface having said aperture,
   f. a pair of O-ring gaskets on opposite sides of said aperture, said gaskets being positioned on said body surface to seal between said body surface and the skirt,
   g. a first of said gaskets (9) being positioned at one extreme of the reciprocations of said skirt,
   h. means for causing reciprocation between said body surface, and
   i. said skirt including a chamfered edge adapted to seal against said first O-ring gasket.

2. The apparatus of claim 1 in which said body includes a shoulder adjacent the cylindrical surface, and said first O-ring is positioned against said body shoulder.

3. The apparatus of claim 2 including a sleeve engaging said body, said sleeve including a retaining shoulder adapted to position said first O-ring.

4. The apparatus of claim 3 in which said means for causing reciprocation between said body surface and said skirt comprises a float.

5. The apparatus of claim 4 in which said skirt includes means for mounting said float thereon.

6. The apparatus of claim 5 in which said mounting means includes a shoulder formed on said skirt.

* * * * *